United States Patent
Rao et al.

(10) Patent No.: US 11,127,328 B2
(45) Date of Patent: Sep. 21, 2021

(54) BAR SCREEN CONTROL CIRCUITRY, BAR SCREEN DISPLAY SYSTEM AND METHOD FOR CONTROLLING A BAR SCREEN

(71) Applicant: BOE TECHNOLOGY GROUP CO., LTD., Beijing (CN)

(72) Inventors: Hui Rao, Beijing (CN); Kejun Hu, Beijing (CN); Zhiguo Zhang, Beijing (CN); Xiaohong Wang, Beijing (CN); Xin Li, Beijing (CN); Shu Wang, Beijing (CN); Xinxin Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/968,998

(22) PCT Filed: Dec. 16, 2019

(86) PCT No.: PCT/CN2019/125739
§ 371 (c)(1),
(2) Date: Aug. 11, 2020

(87) PCT Pub. No.: WO2020/143402
PCT Pub. Date: Jul. 16, 2020

(65) Prior Publication Data
US 2021/0027688 A1 Jan. 28, 2021

(30) Foreign Application Priority Data
Jan. 11, 2019 (CN) .......................... 201910027740.7

(51) Int. Cl.
*G09G 3/20* (2006.01)
*G09G 5/10* (2006.01)
(Continued)

(52) U.S. Cl.
CPC ............. *G09G 3/20* (2013.01); *G06F 1/3231* (2013.01); *G06F 1/3265* (2013.01);
(Continued)

(58) Field of Classification Search
CPC ....... G09G 2330/026; G09G 2330/027; H04N 1/00891; G06F 3/1423–1446;
(Continued)

(56) References Cited

U.S. PATENT DOCUMENTS

| 8,996,898 B2 * | 3/2015 | Podgorny | ............. G06F 1/3287 |
| | | | 713/320 |
| 10,719,116 B2 * | 7/2020 | Kelley | ..................... G06F 1/325 |

(Continued)

FOREIGN PATENT DOCUMENTS

| CN | 101072314 A | 11/2007 |
| CN | 201657158 U | 11/2010 |

(Continued)

*Primary Examiner* — Patrick F Marinelli
(74) *Attorney, Agent, or Firm* — The Webb Law Firm (57) ABSTRACT

The embodiments of the present disclosure provides a bar screen control circuitry, a bar screen display system and the method for controlling the bar screen. The bar screen control circuitry comprises a power supply control circuitry and a processor electrically connected with each other; the power control circuitry is configured to: determine whether a current time reaches a preset starting time, and control a bar screen external to the bar screen control circuitry to enter a first working state when the current time reaches the preset starting time; obtain a closing control signal sent by the processor in response to a preset closing time, and control the bar screen to enter a closed state according to the closing control signal; and the processor is configured to: determine whether the current time reaches the closing time, and send the closing control signal to the power supply control circuitry when the current time reaches the closing time.

14 Claims, 7 Drawing Sheets

(51) Int. Cl.
*G06F 1/3231* (2019.01)
*G06F 1/3234* (2019.01)
*G06F 3/14* (2006.01)

(52) U.S. Cl.
CPC ............ *G06F 3/1423* (2013.01); *G09G 5/10* (2013.01); *G09G 2320/0626* (2013.01); *G09G 2330/022* (2013.01); *G09G 2330/026* (2013.01); *G09G 2330/027* (2013.01)

(58) Field of Classification Search
CPC ......... G06F 3/147; G06F 1/3203–3218; G06F 1/3246; G06F 1/3265
See application file for complete search history.

(56) References Cited

U.S. PATENT DOCUMENTS 10,820,050 B2 * 10/2020 Wang ............... H04N 21/44218
2013/0283072 A1 * 10/2013 Podgorny ............. G06F 1/3203
  713/320
2014/0267447 A1 9/2014 Zhang
2015/0002380 A1 * 1/2015 Kondo ............... H04N 21/4882
  345/82
2020/0004313 A1 * 1/2020 Kelley ................... G04G 21/02
2020/0128296 A1 * 4/2020 Wang .................... G06F 3/1423
2021/0020088 A1 * 1/2021 Son ......................... G06T 7/254
2021/0027688 A1 * 1/2021 Rao ......................... G09G 3/20

FOREIGN PATENT DOCUMENTS

| CN | 102055936 A | 5/2011 |
|---|---|---|
| CN | 202307125 U | 7/2012 |
| CN | 104252840 A | 12/2014 |
| CN | 108573674 A | 9/2018 |
| CN | 208225472 U | 12/2018 |
| CN | 109683844 A | 4/2019 |
| KR | 101472887 B1 | 12/2014 |

* cited by examiner

BAR SCREEN CONTROL CIRCUITRY, BAR SCREEN DISPLAY SYSTEM AND METHOD FOR CONTROLLING A BAR SCREEN

CROSS-REFERENCE TO RELATED APPLICATIONS

This application is the United States national phase of International Application No. PCT/CN2019/125739 filed Dec. 16, 2019, and claims priority to Chinese patent application No. 201910027740.7 filed Jan. 11, 2019, the disclosures of which are hereby incorporated by reference in their entirety.

TECHNICAL FIELD

The application relates to a bar screen control circuitry, a bar screen display system and a method for controlling a bar screen.

BACKGROUND

With the development of intelligent hardware, it is a trend that more and more electronic medias are introduced into business places such as supermarkets, shopping malls and the like, and an electronic bar screen (bar screen for short) is a representative product in the electronic media. The bar screen can display various visual information including price tags, advertisements and videos, so that the bar screen is more and more widely applied.

SUMMARY

The embodiment of the application provides a bar screen control circuitry, comprising a power supply control circuitry and a processor electrically connected with each other;

the power control circuitry is configured to: determine whether a current time reaches a preset starting time, and control a bar screen external to the bar screen control circuitry to enter a first working state when the current time reaches the preset starting time; obtain a closing control signal sent by the processor in response to a preset closing time, and control the bar screen to enter a closed state according to the closing control signal; and the processor is configured to: determine whether the current time reaches the closing time, and send the closing control signal to the power supply control circuitry when the current time reaches the closing time.

The embodiments of the present application provides a bar screen display system comprising a bar screen and the bar screen control circuitry of the first aspect of the embodiment of the present application electrically connected to the bar screen:

the bar screen control circuitry is configured to: detect whether the current time reaches the preset starting time or the preset closing time, control the bar screen to enter the first working state when the current time reaches the starting time, and control the bar screen to enter the closed state when the current time reaches the closing time.

The embodiments of the present application provides a method for controlling a bar screen comprising:

detecting, by a power supply control circuitry, whether a current time reaches a preset starting time, and controlling the bar screen to enter a first working state when the current time reaches the starting time;

detecting, by a processor, whether the current time reaches a preset closing time, and sending a closing control signal to the power supply control circuitry when the current time reaches the closing time; and controlling, by the power supply control circuitry, the bar screen to enter a closed state according to the closing control signal.

Aspects and advantages of the present application will be set forth in part in the description which follows, and in part will be obvious from the description, or may be learned by practice of the present application.

BRIEF DESCRIPTION OF THE DRAWINGS

Aspects and advantages of the present application will become apparent and readily appreciated from the following description of the embodiments, taken in conjunction with the accompanying drawings of which.

DETAILED DESCRIPTION

Reference will now be made in detail to the present application, examples of which are illustrated in the accompanying drawings, wherein reference numerals that are alike or the same throughout the disclosure refer to the same or similar elements or elements having the same or similar functions. In addition, if a detailed description of the known technique is unnecessary for the features of the present application, it is omitted. The embodiments described below with reference to the accompanying drawings are exemplary only for explaining the present application and are not construed as limiting the present application.

It will be understood by those within the art that, unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the prior art and will not be interpreted in an idealized or overly formal sense unless specifically defined herein.

As used herein, the singular forms "a", "an", "said" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may also be present. Further, "connected" or "coupled" as used herein may include wirelessly connected or wirelessly coupled. As used herein, the term "and/or" includes all or any element and all combinations of one or more of the associated listed items.

The following describes the technical solution of the present application and how to solve the above technical problems in detail by specific embodiments. These specific embodiments may be combined with each other, and details of the same or similar concepts or processes may not be repeated in some embodiments. Embodiments of the present application will be described below with reference to the accompanying drawings.

In the related art, the business hours of a large business place are usually long, the bar screen display system consumes a large amount of power during the business hours, and the bar screen display system needs to be continuously powered during non-business hours, which also consumes a small amount of power. If the number of the bar screen display terminals is large, the electric quantity consumed by the whole bar screen display system is also increased sharply, so that the operation cost of a merchant is greatly increased.

The embodiment of the application provides a bar screen display system, including the bar screen and a bar screen control circuitry to which the bar screen electricity is connected, and the bar screen control circuitry is configured to: detect whether the current time reaches a preset starting time or a preset closing time, control the bar screen to enter a first working state when the current time reaches the starting time, and control the bar screen to enter a closed state when the current time reaches the closing time.

Optionally, the bar screen control circuitry is further configured to: detecting whether there is a person in the corresponding area when the bar screen is in the first working state, and control the bar screen to enter a second working state when there is a person in the corresponding area; when the bar screen is in a normal state, determining whether it is not detected that there is a person in the corresponding area within a preset time range, and if it is not detected that there is a person in the corresponding area within the time range, control the bar screen to enter the first working state; the power consumption of the bar screen in the second working state is larger than the power consumption of the bar screen in the first working state.

Figure 1:
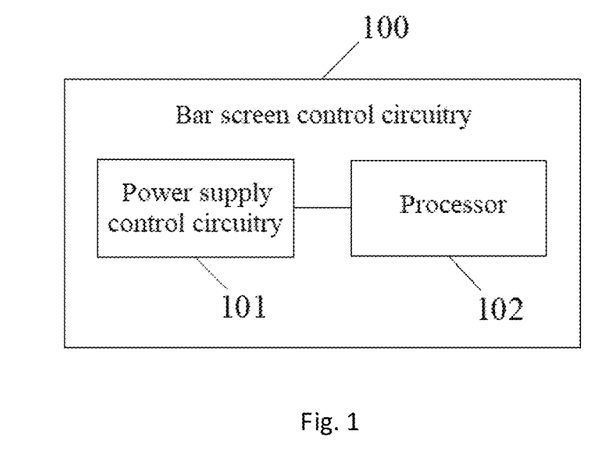
FIG. 1 is a schematic structural framework diagram of a bar screen display system according to an embodiment of the present application.

Optionally, as shown in FIG. 1, the bar screen control circuitry 100 includes a power control circuitry 101 and a processor 102 electrically connected with each other.

The power supply control circuitry 101 is configured to: detect whether the current time reaches a preset starting time, and control the bar screen external to the bar screen control circuitry 100 to enter the first working state when the current time reaches the starting time; obtain a closing control signal sent by the processor 102 in response to a preset closing time, and control the bar screen to enter a closed state according to the closing control signal.

The processor 102 is configured to: determine whether the current time reaches the closing time, and send the closing control signal to the power supply control circuitry 101 when the current time reaches the closing time.

Figure 2:
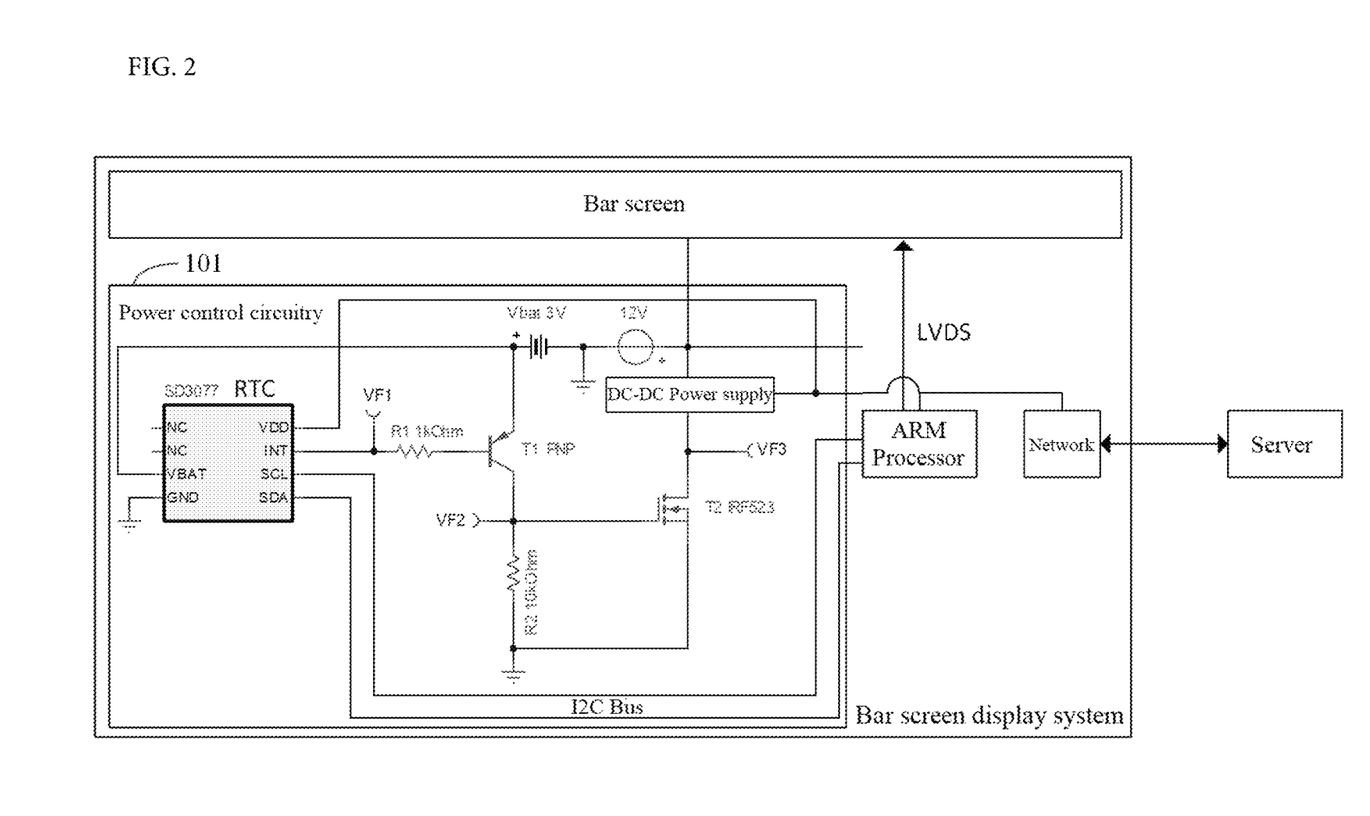
FIG. 2 is a schematic diagram of a circuitry structure of the bar screen display system and a connection relationship between the bar screen display system and a server according to an embodiment of the present disclosure.

Optionally, the processor 102 in this embodiment may comprise a variety of processors 102, as long as it is capable of implementing the functions in this embodiment, for example, an ARM (Advanced RISC Machine (Advanced reduced instruction set computer)) processor 102 shown in FIG. 2.

Optionally, as shown in FIG. 2, the processor 102 is further connected to the bar screen through an LVDS (Low Voltage Differential Signaling) interface, so as to implement data transmission between the processor 102 and the bar screen.

Optionally, as shown in FIG. 2, the power control circuitry 101 provided in the embodiment of the present application includes: the Real-Time Clock (RTC) chip, a switch circuitry, a first power supply module and a second power supply module. The real-time clock chip, the switch circuitry and the first power supply module are electrically connected in sequence; the real-time clock chip is electrically connected with the second power supply module and the processor 102; the first power module is electrically connected to the bar screen and the processor 102.

The real-time clock chip is configured to: detect whether the current time reaches the preset starting time, and control the first power supply module through the switch circuitry to supply power to the bar screen and the bar screen control circuitry 100 when the current time reaches the preset starting time so that the bar screen enters the first working state; when the current time reaches the closing time, obtain a power-down signal sent by the processor 102 in response to the closing time, and control the first power supply module through the switch circuitry to stop supplying power to the bar screen and the bar screen control circuitry 100 according to the power-down signal so that the bar screen enters the closed state.

The processor 102 is specifically configured to: detect whether the current time reaches the closing time, and send the power-down signal to the real-time clock chip when the current time reaches the closing time.

Optionally, the real-time clock chip in the embodiment of the present application may adopt multiple models, as long as it is capable of implementing the functions of the real-time clock chip in the embodiment of the present application, for example, SD 3077. SD 3077 has standard IIC (Inter-Integrated Circuitry) programming interface, a built-in crystal oscillator and a digital temperature compensation Circuitry. It can realize the functions of full-automatic and high-reliability timing without user intervention in normal temperature and wide temperature range. Further, SD 3077 has the characteristics of low power consumption (0.8 μA typical value), wide working voltage (2.7V-5.5V), support of battery power measurement and the like. Especially, a programmable alarm interrupt output end of SD 3077 can output a required control signal.

Optionally, the output voltage of the first power supply module is greater than the output voltage of the second power supply module.

Alternatively, as shown in FIG. 2, the Serial Clock input terminal SCL (Serial Clock Line) and the Serial Data input/output terminal SDA (Serial Data Line) of the real-time Clock chip are electrically connected to the ARM processor 102 through the IIC bus, so as to perform signal transmission with the ARM processor 102.

Optionally, the switch circuitry comprises: a first resistor R1, a second resistor R2, a first switch unit T1 and a second switch unit T2.

The alarm interruption output end INT of the real-time clock chip is electrically connected with the control end of the first switch unit T1 through a first resistor R1; a first end of the first switch unit T1 is electrically connected to the second power supply module, and a second end of the first switch unit T1 is grounded through a second resistor and is electrically connected to a control end of the second switch unit T2; a first end of the second switch unit T2 is electrically connected with the first power supply module, and a second end of the second switch unit T2 is grounded;

The real-time clock chip is configured to: output a first power supply control signal at the starting time through the alarm interruption output end INT to enable the first switch unit T1 and the second switch unit T2 to be conducting, so that the first power supply module supplies power to the bar screen and the bar screen control circuitry 100; and output a second power supply control signal at the closing time to enable the first switch unit T1 and the second switch unit T2 to be cut off, so that the first power supply module stops supplying power to the bar screen and the bar screen control circuitry 100.

Optionally, the first resistor R1 and the second resistor R2 in the embodiment of the present application may select a resistor element with a corresponding resistance value according to actual needs. In one example, as shown in FIG. 2, the first resistor R1 may be a resistive element having a resistance of 1 kOhm (kiloohm), and the second resistor R2 may be a resistive element having a resistance of 10 kOhm.

Optionally, the first switch unit T1 in the embodiment of the present application may be a PNP type transistor as shown in FIG. 2; at this time, the control terminal of the first switch unit T1 is the base of the PNP transistor, the first terminal is the collector of the PNP transistor, and the second terminal is the emitter of the PNP transistor.

Optionally, the second switch unit T2 in the embodiment of the present application may be a MOSFET (Metal-Oxide-Semiconductor Field-Effect Transistor). In one example, the second switch unit T2 may be an N-MOS (N-type MOS transistor) with a model IRF523 as shown in FIG. 2, where the control terminal of the second switch unit T2 is the gate of the N-MOS, the first terminal is the drain of the N-MOS, and the second terminal is the source of the N-MOS.

Optionally, the first power supply module comprises a DC power supply unit and a DC voltage converter.

A first end of the DC voltage converter is electrically connected to the positive electrode of the DC power supply unit and the bar screen, a second end of the DC voltage converter is electrically connected to the second end of the second switch unit T2, and a third end of the DC voltage converter is electrically connected to the positive power supply pin VDD of the real-time clock chip and the processor 102; the negative electrode of the DC power supply unit is grounded.

The DC power supply unit is configured to input a first power supply voltage to the DC voltage converter, and the DC voltage converter is configured to convert the first power supply voltage into a second power supply voltage and outputting the second power supply voltage.

Alternatively, the DC voltage converter may be a DC-DC (Direct Current-Direct Current) power supply as shown in FIG. 2, the DC power supply unit may provide a DC voltage of 12V as the first power supply voltage, and the DC-DC power supply may convert the DC voltage of 12V into a DC voltage of 3.3V as the second power supply voltage.

Optionally, the second power supply module comprises a battery; the positive electrode of the battery is electrically connected with the input end VBAT of the standby battery of the real-time clock chip, and the negative electrode of the battery is grounded. The battery can be a rechargeable battery or a non-rechargeable battery, and can be a battery with various shapes, such as a button battery.

Optionally, the bar screen control circuitry 100 provided in this embodiment of the present application further includes a detection device electrically connected to the processor 102.

The detection device is configured to: detect whether there is a person in the corresponding area when the bar screen is in a first working state; when it is detected that there is a person in the corresponding region, feed back the detection result to the processor 102.

The processor 102 is further configured to: control the bar screen to enter a second working state according to the detection result; when the bar screen is in the second working state, determine whether the detection device does not detect that there is a person in the corresponding area within a preset time range, and if the detection device does not detect that there is a person in the corresponding area within the time range, control the bar screen to enter the first working state; the power consumption of the bar screen in the second working state is larger than that in the first working state.

Optionally, for business places such as supermarkets, shopping malls and the like, the bar screen display system provided by the embodiment of the application can be arranged on each shelf in the business places, and the number of the bar screen display systems on each shelf can be determined according to actual needs.

Optionally, the detection devices may be disposed at the outer edges of the bar screen display systems, the number of the detection devices may be determined according to actual requirements, and for the same region to be detected, more than one detection device may be disposed at an outer edge of any bar screen display system near the region to be detected. Alternatively, the detection device in the embodiment of the present application may be an Infrared (IR) sensor.

Figure 3:
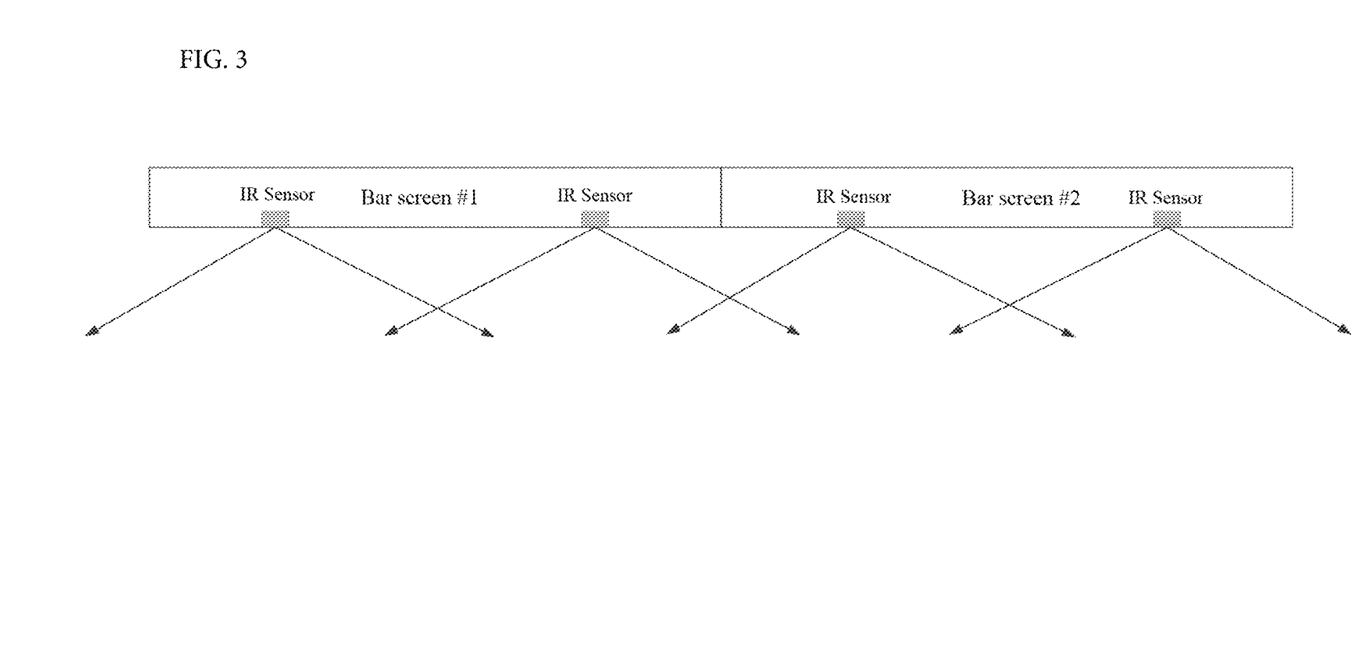
FIG. 3 is a schematic position diagram of an infrared sensor on the bar screen in an embodiment of the present application.

In one example, for a certain shelf aisle in a supermarket, a shopping mall and other business places, two infrared sensors are arranged on the outer edge of the bar screen display system at the lower layer of the shelf near the shelf aisle. As shown in FIG. 3, the detection angle is wide and can reach 120 degrees.

Optionally, the processor 102 is in communication connection with a server external to the bar screen control circuitry 100. The processor 102 is further configured to: send an identification information of the bar screen to the server according to the detection result; and obtain a work control signal sent by the server in response to the identification information, and control the bar screen to enter the second working state according to the work control signal.

Alternatively, the processor 102 may be communicatively coupled to a Server via a C/S (Client/Server) network.

The detailed principles of the bar screen display system and the bar screen control circuitry 100 therein provided in the embodiments of the present application will be described in detail with reference to the subsequent method embodiments, and are not repeated herein.

Figure 4:
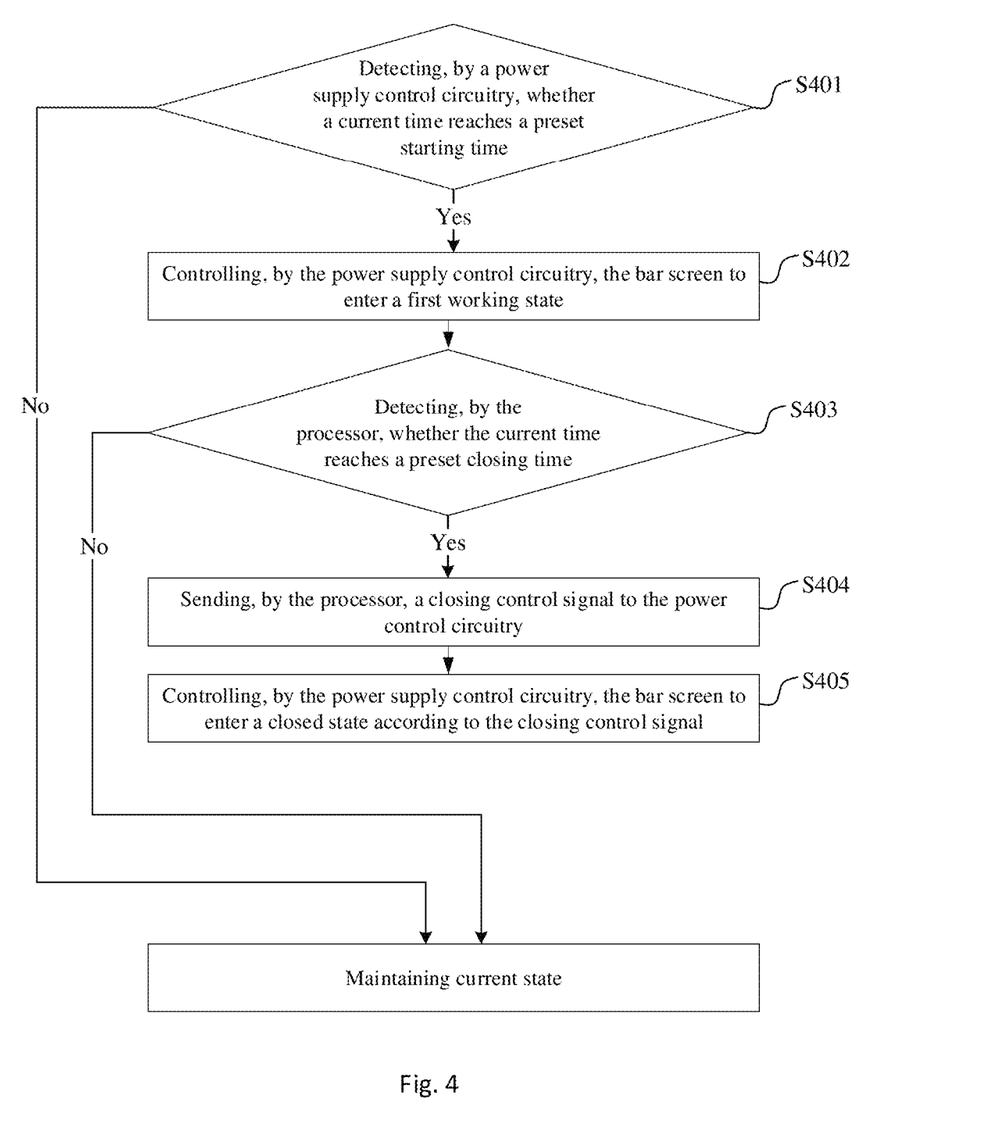
FIG. 4 is a schematic flowchart of a method for controlling a bar screen provided in an embodiment of the present application.

Based on the same inventive concept, the embodiment of the present application provides a method for controlling a bar screen, which can be applied to the bar screen control circuitry 100. As shown in FIG. 4, the method for controlling a bar screen includes the following steps S401 to S405:

S401, detecting, by a power supply control circuitry 101, whether a current time reaches a preset starting time; if yes, executing S402, if no, keeping the current state.

Alternatively, the starting time may be determined according to actual requirements and written into the real-time clock chip in the power control circuitry 101 in advance. For example, for a business place such as a supermarket, and a shopping mall, the time when business begins may be set as the starting time.

Optionally, a real-time clock chip in the power control circuitry 101 detects whether a current time reaches the preset starting time.

In one example, in the circuitry shown in FIG. 2, the determined starting time can be written by the processor 102 over the IIC bus to a time alarm register internal to the RTC chip.

S402, controlling, by the power supply control circuitry 101, the bar screen to enter a first working state.

Optionally, when the current time reaches the starting time, the power supply control circuitry 101 supplies power to the bar screen and the bar screen control circuitry 100, so that the bar screen enters the first working state.

Optionally, when the current time reaches the starting time, the real-time clock chip controls the first power supply module through the switch circuitry to supply power to the bar screen and the bar screen control circuitry 100, so that the bar screen enters the first working state.

Optionally, controlling the bar screen to enter a first working state includes controlling the bar screen to display the first designated information at the first brightness.

The brightness value of the first brightness and the information amount and information type of the first specific information can be set according to actual requirements. Generally, the brightness value of the first brightness is set to be a smaller brightness value, and the information amount of the first specific information is set to be smaller. For example, for business places such as supermarkets, malls and the like, the first specific information may be set to include only text information, without image information, or include only price information of a product, without other information, so that the first working state realizes low power consumption, and the bar screen operates in the low power consumption mode.

The following takes the bar screen control circuitry 100 and the bar screen display system shown in FIG. 2 as an example, and further illustrates steps S401 and S402:

the RTC chip detects whether the current time reaches the starting time written in advance. When the starting time is reached, the RTC chip outputs a low level (namely a first power supply control signal) through an alarm interrupt output end INT, so that a VF1 signal is low. Further, a PNP type triode T1 is therefore conducting, and the level at VF2 is 3.3V. At this time, the N-MOS transistor T2 is also conducting, and VF3 is grounded. The DC-DC power supply can convert a 12V power supply voltage output by a DC power supply unit into a 3.3V power supply voltage and output the power supply voltage, so that power is supplied to the bar screen and the bar screen control circuitry 100, and the bar screen enters a first working state. Furthermore, when the RTC chip continuously outputs a low level through the alarm interrupt output end INT, the bar screen can be continuously in the first working state.

S403, detecting, by the processor 102, whether the current time reaches a preset closing time; if yes, executing S404, if no, keeping the current state.

Alternatively, the closing time may be determined according to actual needs and written into the processor 102 in advance. For example, for a supermarket, a shopping mall, or other business, the time for starting of the closing down may be set as the closing time. Alternatively, the closing time may be written in advance into the processor 102 by a server through a communication network.

S404, sending, by the processor 102, a closing control signal to the power control circuitry 101.

Alternatively, when the current time reaches the closing time, the processor 102 sends a power-down signal to the power supply control circuitry 101.

Optionally, the processor 102 periodically checks the timing state of a real-time clock chip in the power control circuitry 101, and when the current time reaches the closing time, the processor 102 sends a power-down signal to the real-time clock chip.

In the example shown in FIG. 2, the ARM processor 102 may periodically check the real-time clock register inside the RTC chip through the IIC bus, and when the current time reaches the closing time, the ARM processor 102 writes a power-down signal to the interrupt enable bit INTAF of the time interrupt control register inside the RTC chip through the IIC bus.

S405, controlling, by the power supply control circuitry 101, the bar screen to enter a closed state according to the closing control signal.

Optionally, the power control circuitry 101 stops supplying power to the bar screen and the processor 102 according to the power-down signal, so that the bar screen enters the closed state. Specifically, the power control circuitry 101 controls the first power supply module through the switch circuitry to stop supplying power to the bar screen and the processor 102 according to the power-down signal.

The following takes the bar screen control circuitry 100 shown in FIG. 2 as an example to further illustrate steps S403-S405:

Under the control of the written power-down signal, the output signal of the alarm interruption output end INT of the RTC chip is changed from a low level to a high level (namely, a second power supply control signal), the VF1 signal is changed to a high level, the PNP type triode T1 is changed from conducting to cut-off and the VF2 level is grounded. Further, the N-MOS transistor T2 is also changed from conducting to cut-off, the grounding end VF3 of the DC-DC power supply is changed to be floating. At this time, the DC-DC power supply does not supply power to the bar screen and the processor 102 any more, such that the bar screen enters a closed state and does not work any more. Therefore, the consumption of electric of the bar screen is stopped.

Figure 5:
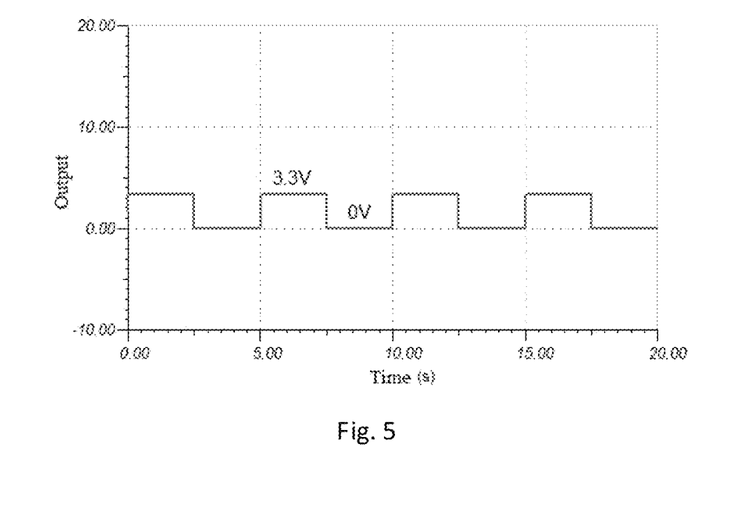
FIG. 5 is a schematic diagram of the transient response of the VF1 signal over time in the circuitry of FIG. 2.
Figure 6:
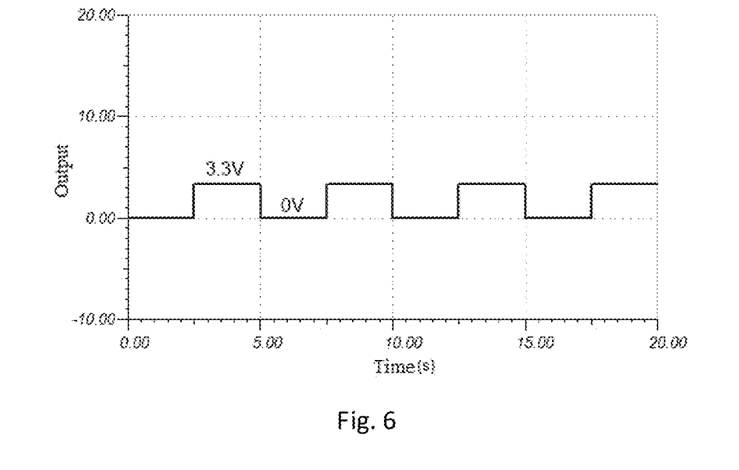
FIG. 6 is a schematic diagram of the transient response of the VF2 signal over time in the circuitry of FIG. 2.
Figure 7:
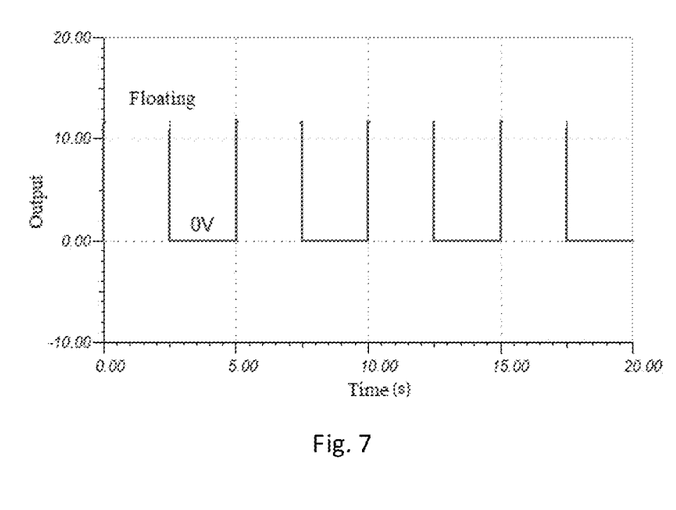
FIG. 7 is a schematic diagram of the transient response of the VF3 signal over time in the circuitry of FIG. 2.

In the circuitry configuration shown in FIG. 2, the signal transient response trends of VF1, VF2 and VF3 are shown in FIG. 5, FIG. 6 and FIG. 7, respectively.

Furthermore, when the RTC chip continuously outputs a high level through the alarm interrupt output end INT, the bar screen can be continuously in a closed state, so that the consumption of the power on the bar screen is stopped in a time period from the closing time to the next starting time, and the power consumption of the whole bar screen display system is reduced.

Optionally, the power control circuitry 101 controls the second power supply module to supply power to the bar screen control circuitry 100 according to the power-down signal.

In the time period from the closing time to the next starting time, the second power supply module supplies power, so that the real-time clock chip can continuously run to realize a timing function, and the bar screen is controlled to enter the first working state again when the next starting time is reached. Further, the processor 102 is capable of modifying the starting time written in the real-time clock chip according to the modification instruction of the starting time by the user, and receiving the modification of the closing time written in the processor 102 by the user, for example, the modification of the closing time written in the processor 102 by the user through the server.

Figure 8:
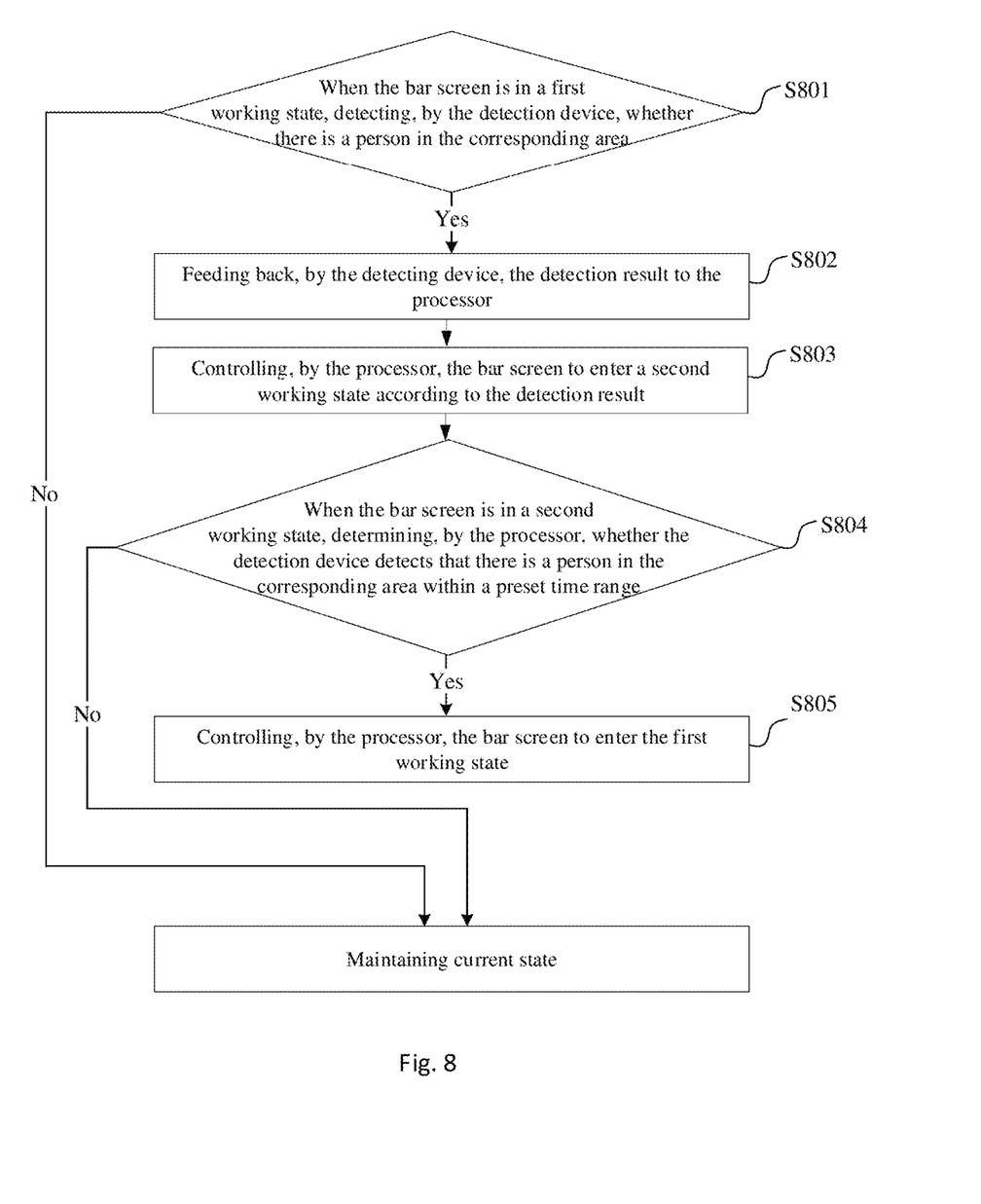
FIG. 8 is a part of a schematic flowchart of a method for controlling a bar screen according to an embodiment of the present application.

Optionally, as shown in FIG. 8, the method for controlling a bar screen provided in this embodiment of the present application, in addition to the foregoing steps S401 to S405, further includes the following steps S801 to S805:

S801, when the bar screen is in a first working state, detecting, by the detection device, whether there is a person in the corresponding area; if yes, executing S802, if not, keeping the current state.

Optionally, when the bar screen is in the first working state, an infrared sensor is used for detecting whether there is a person in the corresponding area. In one example, for a business location such as a supermarket and a shopping mall, etc., the detected corresponding area may be a shelf aisle corresponding to the shelf to which the infrared sensor belongs.

S802, feeding back, by the detecting device, the detection result to the processor 102.

Alternatively, when the bar screen is in the first working state, the INT pin of the infrared sensor keeps output at a low level, and when it is detected that there is a person in the corresponding area, the output signal of the INT pin of the infrared sensor changes from a low level to a high level and transmits the high level signal to the processor 102. When it is continuously detected that there is a person in the corresponding area, the infrared sensor may continuously output a high level signal to the processor 102.

S803, controlling, by the processor 102, the bar screen to enter a second working state according to the detection result.

Optionally, the processor 102 sends identification information of the bar screen to the server according to the detection result; the processor 102 obtains a work control signal sent by the server in response to the identification information, and controls the bar screen to enter a second working state according to the work control signal.

Optionally, the identification information of the bar screen may be a serial number or a hardware identifier of the bar screen, or may be position information of a position where the bar screen is located. In one embodiment, for a business place such as a supermarket, a shopping mall and the like, the identification information of the bar screen may be a shelf number of a shelf to which the bar screen belongs.

Optionally, after receiving the high level signal transmitted by the infrared sensor, the processor 102 activates an interrupt and wake-up task. The interrupt and wake-up task is used to send the identification information of each bar screen to the server through the network, and the server controls, through the processor 102, according to the received identification information, each corresponding bar screen to enter the second working state.

Optionally, the bar screen is controlled to enter a second working state, including: controlling the bar screen to display the second designated information at the second brightness.

The brightness value of the second brightness and the information quantity and the information type of the second designated information can be set according to actual requirements. Optionally, the brightness value of the second brightness is greater than the brightness value of the first brightness. Optionally, the content of the second designated information is more than the content of the first designated information. Correspondingly, the power consumption of the second working state is greater than that of the first working state.

In one example, for a business location such as a supermarket, a shopping mall and the like, the second designated information may be set to include at least one of text information and image information, or include at least two of price information, advertisement information, and promotion information of the product, so that the second working state satisfies daily business requirements.

In one example, for a supermarket, a shopping mall, or other places of business, the processor 102 activates an interrupt wakeup task upon receiving a high level signal transmitted by the infrared sensor. The interrupt wakeup task is used for sending the shelf numbers of the shelf to which the bar screens belong to a server through a Socket (port) of a User Datagram. Protocol (UDP). The server inquires the number of the bar screen in the shelf according to the received shelf numbers, and then sends a work control signal to the processor 102 according to the inquired the number of the bar screen. The processor 102 controls and increases the PWM (Pulse Width Modulation) frequency of the corresponding bar screen according to the work control signal, increases the screen brightness of the corresponding bar screen from the first brightness to the second brightness, and simultaneously, turns on the image or video processing unit to play the advertisement information or the promotion information of the product.

In one example, when the processor 102 continuously receives a high level signal sent by the infrared sensor, the shelf number of the shelf to which the bar screen belongs is continuously sent to the server, the server continuously inquires the bar screen number of each bar screen in the shelf, and sends an operation control signal to the processor 102 according to the bar screen number. The processor 102 controls the corresponding bar screen to keep a high-brightness state (i.e., the second brightness), and continuously plays the advertising information or the promotion information of the product.

S804, when the bar screen is in a second working state, determining, by the processor 102, whether the detection device detects that there is a person in the corresponding area within a preset time range; if so, the current state is maintained, otherwise, S805 is executed.

Optionally, when the bar screen is in the second working state, the processor 102 determines whether a detection result sent by the detection device is received within a preset time range, if yes, it is determined that the detection device detects that there is a people in the corresponding area within the preset time range, and if not, it is determined that there is no people in the corresponding area within the preset time range.

S805, controlling, by the processor 102, the bar screen to enter the first working state.

Optionally, the processor 102 controls the bar screen to switch from the second working state to the first working state.

Optionally, the processor 102 controls the bar screen to display the first designated information at a first brightness.

In an example, if the processor 102 determines that the detection result sent by the detection device is not received within a preset time range, the processor stops sending the identification information of each bar screen to the server, and when the server cannot receive the identification information, the server also stops sending the operation control signal based on the identification information to the processor 102, so that the screen brightness of the bar screen is reduced from the second brightness with a higher brightness value to the first brightness. Thereby, the displayed information is reduced from the second designated information to the first designated information, thereby realizing the change of the operation state of the bar screen from the second operation state with higher power consumption to the first operation state with lower power consumption, and effectively reducing the power consumption of the bar screen when there is no person in the shelf aisle.

In an optional implementation, the method for controlling a bar screen provided in an embodiment of the present application further includes the following steps:

Periodically querying, by the processor 102, the power state of the second power supply module in the power control circuitry 101, and sending the queried power information to the server.

Taking the circuitry shown in FIG. 2 as an example, the ARM processor 102 may query the power state of the battery in the battery power register at regular time through the IIC bus, and send the queried battery power information to the server, so that the user may conveniently know the power consumption state of the bar screen system.

By applying the technical scheme provided by the embodiment of the application, one or more of the following beneficial effects can be realized at least.

1) The method and the device of the present embodiments can automatically detect the current time, determine whether the preset starting time or the preset closing time is reached, control the bar screen to enter a first working state when the starting time is reached, and control the bar screen to enter a closed state when the closing time is reached, so that the bar screen can only work in the preset working time period (namely the time period between the starting time and the closing time) and is closed in the non-working time period. Therefore, the power consumption of the bar screen in the non-working time period is effectively reduced, and the power consumption of the whole bar screen display system in the non-working time period is also effectively reduced.

2) According to the embodiment of the application, the pedestrians in the corresponding area within the preset working time period can be detected, and the working state of the bar screen is adjusted according to the detection result, so that the bar screen is changed from the first working state to the second working state with higher power consumption only when there is a person in the corresponding area. Therefore, more information can be displayed for the pedestrians, the visual experience of the pedestrians is improved, and the product promotion requirement in the business place is met. When there is no person in the corresponding area or a pedestrian moves away from the corresponding area, the bar screen is kept in a first working state with lower power consumption, the power consumption of the bar screen in the corresponding area without the person is effectively reduced, and the power consumption waste is reduced. Therefore, the power consumption of the bar screen in the working period is effectively reduced, and the power consumption of the whole bar screen display system in the working time period is also effectively reduced.

3) The power supply method and the power supply device can realize power supply in different modes in different time periods. Specifically, a first power supply module with higher power supply voltage is adopted to supply power to the bar screen and the bar screen control circuitry in a preset working time period so as to meet the power utilization requirement during the working time period. In a non-working time period, a second power supply module with lower power supply voltage is adopted to supply power to the bar screen control circuitry, and the power supply to the bar screen is stopped. The basic control function of the bar screen control circuitry can be maintained by lower electric quantity while the power consumption caused by the bar screen is avoided. Therefore, on the premise of not influencing the whole function of the bar screen display system, the power consumption of the bar screen and the bar screen control circuitry is effectively reduced.

4) The bar screen control circuitry and the bar screen display system are simple in circuitry structure and low in cost, and closed-loop power supply control can be achieved. The system power consumption is optimized efficiently and reliably, and the operation cost of an enterprise is reduced.

Those of skill in the art will understand that the step, measures, schemes in the discussed various operations, methods, procedure in this application can be alternated, modified, combined, or deleted. Further, the other step, measures, schemes in the discussed various operations, methods and procedure that have been discussed in this application may be alternated, modified, rearranged, decomposed, combined, or deleted. Further, the steps, measures, and schemes in the various operations, methods, and procedure disclosed in the present application in the prior art can also be alternated, modified, rearranged, decomposed, combined, or deleted.

The terms "first" and "second" are used for descriptive purposes only and are not to be construed as indicating or implying relative importance or to implicitly indicate the number of technical features indicated. Thus, a feature defined as "first" or "second" may explicitly or implicitly include one or more of that feature. In the description of the present disclosure, "a plurality" means two or more, unless otherwise specified.

It should be understood that, although the steps in the flowcharts of the figures are shown in order as indicated by the arrows, the steps are not necessarily performed in order as indicated by the arrows. The steps are not performed in the exact order shown and may be performed in other orders unless otherwise indicated herein. Moreover, at least a portion of the steps in the flowchart of the figure may include multiple sub-steps or multiple stages, which are not necessarily performed at the same time, but may be performed at different times, and the order of execution is not necessarily sequential, but may be performed alternately or alternately with other steps or at least a portion of the sub-steps or stages of other steps. The foregoing is only a few embodiments of the present application and it should be noted that those skilled in the art can make various improvements and modifications without departing from the principle of the present application, and that these improvements and modifications should also be considered as the protection scope of the present application.

What is claimed is:

1. A bar screen control circuitry comprising a power supply control circuitry and a processor electrically connected with each other;

the power control circuitry is configured to:
determine whether a current time reaches a preset starting time, and control a bar screen external to the bar screen control circuitry to enter a first working state when the current time reaches the preset starting time;

obtain a closing control signal sent by the processor in response to a preset closing time, and control the bar screen to enter a closed state according to the closing control signal; and the processor is configured to:
  determine whether the current time reaches the closing time, and send the closing control signal to the power supply control circuitry when the current time reaches the closing time;

wherein:
  the power control circuitry comprises a real-time clock chip, a switch circuitry, a first power supply module and a second power supply module;
  the real-time clock chip, the switch circuitry and the first power supply module are electrically connected in sequence;
  the real-time clock chip is electrically connected with the second power supply module and the processor respectively;
  the first power supply module is electrically connected with the bar screen and the processor;
  the real-time clock chip is configured to:
    detect whether the current time reaches the preset starting time, and control the first power supply module through the switch circuitry to supply power to the bar screen and the bar screen control circuitry when the current time reaches the preset starting time so that the bar screen enters the first working state; and
    when the current time reaches the closing time, obtain a power-down signal sent by the processor in response to the closing time, and control the first power supply module through the switch circuitry to stop supplying power to the bar screen and the bar screen control circuitry according to the power-down signal so that the bar screen enters the closed state;
  the processor is specifically configured to: detect whether the current time reaches the closing time, and send the power-down signal to the real-time clock chip when the current time reaches the closing time;
  the switch circuitry comprises a first resistor, a second resistor, a first switch unit and a second switch unit.

2. The bar screen control circuitry of claim 1, further comprising a detection device electrically connected to the processor;
  the detection device is configured to: detect whether there is a person in a corresponding area when the bar screen is in the first working state; when it is detected that there is a person in the corresponding area, feed back a detection result to the processor; and
  the processor is further configured to: control the bar screen to enter a second working state according to the detection result; when the bar screen is in the second working state, determine whether the detection device does not detect that there is a person in the corresponding area within a preset time range, and if the detection device does not detect that there is a person in the corresponding area within the time range, control the bar screen to enter the first working state; and
  a power consumption of the bar screen in the second working state is greater than the power consumption of the bar screen in the first working state.

3. The bar screen control circuitry of claim 2, wherein the processor is communicatively connected to a server external to the bar screen control circuitry;

the processor is further configured to: send an identification information of the bar screen to the server according to the detection result; and obtain a work control signal sent by the server in response to the identification information, and control the bar screen to enter the second working state according to the work control signal.

4. The bar screen control circuitry of claim 1, wherein an alarm interruption output end of the real-time clock chip is electrically connected with a control end of the first switch unit through the first resistor; a first end of the first switch unit is electrically connected with the second power supply module, and a second end of the first switch unit is grounded through the second resistor and is electrically connected with a control end of the second switch unit; a first end of the second switch unit is electrically connected with the first power supply module, and a second end of the second switch unit is grounded; the real-time clock chip is configured to: output a first power supply control signal at the starting time through the alarm interruption output end to enable the first switch unit and the second switch unit to be conducting, so that the first power supply module supplies power to the bar screen and the bar screen control circuitry; and output a second power supply control signal at the closing time to enable the first switch unit and the second switch unit to be cut off, so that the first power supply module stops supplying power to the bar screen and the bar screen control circuitry.

5. The bar screen control circuitry of claim 4, wherein the first power supply module includes a DC power supply unit and a DC voltage converter;
  a first end of the DC voltage converter is electrically connected to a positive electrode of the DC power supply unit and the bar screen, a second end of the DC voltage converter is electrically connected with the second end of the second switch unit, and a third end of the DC voltage converter is electrically connected to a positive power supply pin of the real-time clock chip and the processor; a negative electrode of the DC power supply unit is grounded;
  the DC power supply unit is configured to input a first power supply voltage to the DC voltage converter, and the DC voltage converter is configured to convert the first power supply voltage into a second power supply voltage and outputting the second power supply voltage.

6. The bar screen control circuitry of claim 1, wherein the second power module comprises a battery; and a positive electrode of the battery is electrically connected with an input end of a standby battery of the real-time clock chip, and a negative electrode of the battery is grounded.

7. A bar screen display system comprising:
  a bar screen and bar screen control circuitry electrically connected to the bar screen;
  the bar screen control circuitry comprising a power supply control circuitry and a processor electrically connected with each other;
  the power control circuitry is configured to:
    determine whether a current time reaches a preset starting time, and control the bar screen to enter a first working state when the current time reaches the preset starring time; and
    obtain, a closing control signal sent by the processor in response to a preset dosing time, and control the bar screen to enter a closed state according to the closing control signal; and the processor is configured to:
  determine whether the current lime reaches the closing time, and send the closing control signal to the power supply control circuitry when the current time readies the closing time;
wherein:
  the power control circuitry comprises a real-time clock chip, a switch circuitry, a first power supply module and a second power supply module;
  the real-time clock chip, the switch circuitry and the first power supply module are electrically connected in sequence;
  the real-time clock chip is electrically connected with the second power supply module and the processor respectively;
  the first power supply module is electrically connected with the bar screen and the processor;
  the real-time clock chip is configured to:
    detect whether the current time reaches the preset starting time, and control the first power supply module through the switch circuitry to supply power to the bar screen and the bar screen control circuitry when the current time reaches the preset starting time so that the bar screen enters the first working state; and
    when the current time reaches the closing time, obtain a power-down signal sent by the processor in response to the closing time, and control the first power supply module through the switch circuitry to stop supplying power to the bar screen and the bar screen control circuitry according to the power-down signal so that the bar screen enters the closed state;
  the processor is specifically configured to: detect whether the current time reaches the closing time, and send the power-down signal to the real-time clock chip when the current time reaches the closing time;
  the switch circuitry comprises a first resistor, a second resistor, a first switch unit and a second switch unit.

8. The bar screen display system of claim 7,
the bar screen control circuitry is further configured to:
  detect whether there is a person in a corresponding area when the bar screen is in the first working state, and control the bar screen to enter a second working state when there is a person in the corresponding area; when the bar screen is in a normal state, determine whether it is not detected that there is a person in the corresponding area within a preset time range, and if it is not detected that there is a person in the corresponding area within the time range, control the bar screen to enter the first working state; and
a power consumption of the bar screen in the second working state is greater than the power consumption of the bar screen in the first working state.

9. A method for controlling a bar screen comprising:
detecting, by a power supply control circuitry, whether a current time reaches a preset starting time, and controlling the bar screen to enter a first working state when the current time reaches the starting time;
detecting, by a processor, whether the current time reaches a preset closing time, and sending a closing control signal to the power supply control circuitry when the current time reaches the closing time; and
controlling, by power supply control circuitry, the bar screen to enter a closed state according to the closing control signal;
wherein:
  the power control circuitry comprises a real-time clock chip, a switch circuitry, a first power supply module and a second power supply module;
  the real-time clock chip, the switch circuitry and the first power supply module are electrically connected in sequence;
  the real-time clock chip is electrically connected with the second power supply module and the processor respectively;
  the first power supply module is electrically connected with the bar screen and the processor;
  the real-time clock chip is configured to:
    detect whether the current time reaches the preset starting time, and control the first power supply module through the switch circuitry to supply power to the bar screen and the bar screen control circuitry when the current time reaches the preset starting time so that the bar screen enters the first working state; and
    when the current time reaches the closing time, obtain a power-down signal sent by the processor in response to the closing time, and control the first power supply module through the switch circuitry to stop supplying power to the bar screen and the bar screen control circuitry according to the power-down signal so that the bar screen enters the closed state;
  the processor is specifically configured to: detect whether the current time reaches the closing time, and send the power-down signal to the real-time clock chip when the current time reaches the closing time;
  the switch circuitry comprises a first resistor, a second resistor, a first switch unit and a second switch unit.

10. The method for controlling a bar screen of claim 9, wherein controlling the bar screen to enter and maintain the first working state when the current time reaches the starting time comprises:
when the current time reaches the starting time, supplying, by the power supply control circuitry, power to the bar screen and the bar screen control circuitry, so that the bar screen enters the first working state.

11. The method for controlling a bar screen of claim 9, wherein sending a closing control signal to the power control circuitry when the current time reaches the closing time comprises:
when the current time reaches the closing time, sending a power-down signal to the power supply control circuitry; and
controlling, by the power supply control circuitry, the bar screen to enter a closed state according to the closing control signal comprises:
stopping, by the power supply control circuitry, supplying power to the bar screen and the processor according to the power-down signal, so that the bar screen enters the closed state.

12. The method for controlling a bar screen of claim 9, further comprising:
when the bar screen is in the first working state, detecting, by the detection device, whether there is a person in a corresponding area;
when it is detected that there is a person in the corresponding area, feeding back, by the detection device, a detection result to the processor;
controlling, by the processor, the bar screen to enter a second working state according to the detection result;

when the bar screen is in the second working state, determining, by the processor, whether the detection device detects that there is a person in the corresponding area within a preset time range;

if it is not detected, by the detection device, that there is a person in the corresponding area within the time range, controlling, by the processor, the bar screen to enter the first working state; and the power consumption of the bar screen in the second working state is larger than the power consumption of the bar screen in the first working state.

13. The method for controlling a bar screen of claim 12, wherein controlling, by the processor, the bar screen to enter a second working state according to the detection result comprising:

sending, by the processor, an identification information of the bar screen to a server according to the detection result; and obtaining, by the processor, a work control signal sent by the server in response to the identification information and controlling the bar screen to enter the second working state according to the work control signal.

14. The method for controlling a bar screen of claim 12, wherein said controlling the bar screen to enter a first working state comprises: controlling the bar screen to display a first designated information at a first brightness; and controlling the bar screen to enter a second working state comprises: controlling the bar screen to display a second designated information at a second brightness; and a brightness value of the second brightness is larger than a brightness value of the first brightness.

* * * * *